United States Patent [19]
Chen et al.

[11] 3,723,715
[45] Mar. 27, 1973

[54] FAST MODULO THRESHOLD OPERATOR BINARY ADDER FOR MULTI-NUMBER ADDITIONS

[75] Inventors: Tien Chi Chen, San Jose, Calif.; Irving T. Ho, Poughkeepsie, N.Y.

[73] Assignee: International Business Machines Corporation, Armonk, N.Y.

[22] Filed: Aug. 25, 1971

[21] Appl. No.: 174,753

[52] U.S. Cl. ....................235/175
[51] Int. Cl. ....................G06f 7/50
[58] Field of Search ....................235/175, 164

[56] References Cited

UNITED STATES PATENTS

| | | | |
|---|---|---|---|
| 3,603,776 | 9/1971 | Weinberger | 235/175 |
| 3,636,334 | 1/1972 | Svoboda | 235/175 |

*Primary Examiner*—Malcolm A. Morrison
*Assistant Examiner*—David H. Malzahn
*Attorney*—Robert J. Haase et al.

[57] ABSTRACT

A fast adder for adding more than three words, the correspondingly weighted bits of which are applied to respective bit column adders. The column adders simultaneously produce respective sum and carry result bits of overlapping positional significance or weight. The maximum number of result bits having the same weight is determined by the quantity of words to be added at the same time (which establishes the number of bits in each bit column). In the disclosed embodiment, seven words are added at a given time and no more than three of the generated result bits have the same weight. In effect, the seven operand words are reduced to a subtotal of three result operand words in one computational cycle irrespective of the bit length of the words being added. The subtotal operands are reduced to a final sum by application to conventional carry save and carry look-ahead adders. Equal weighted wire-ORing and matrix memory techniques are employed in the respective column adders to conserve required computational hardware and to facilitate large scale circuit integration.

8 Claims, 3 Drawing Figures

PATENTED MAR 27 1973

3,723,715

SHEET 1 OF 3

INVENTORS
TIEN CHI CHEN
IRVING T. HO

BY

ATTORNEY

FAST MODULO THRESHOLD OPERATOR BINARY ADDER FOR MULTI-NUMBER ADDITIONS

BACKGROUND OF THE INVENTION

Traditionally, computers have been designed to add only two words (numbers) at the same time. Irrespective of the quantity of words to be added together, two of the words are added to produce a first subtotal, a third word is added to the first subtotal to produce a second subtotal and so on until each of the words to be added is processed in sequence and the final subtotal becomes the desired sum. This type of data processing saves computer hardware but only at the expense or trade-off of prolonged computational time. As computer hardware becomes smaller in size and more reliable in operation, it behooves the system designer to find ways to achieve significant reduction in computational time while trading off moderate increase in hardware complexity.

Copending patent application Ser. No. 96,875, filed Dec. 10, 1970, now Pat. No. 3,675,001, in the name of Shanker Singh and assigned to the present assignee, discloses a fast adder which accomplishes the foregoing trade-off of reduced computer time for moderately increased hardware complexity. This is achieved through the use of a technique in which no more than two of the subtotal sum and carry bits (resulting from the addition of correspondingly weighted bits of the words to be added) share the same weight. In accordance with the present invention, utilizing modulo threshold operator technique, three or more of the subtotal bits are permitted to share the same weight. Thus, the elative to the one disclosed in the aforementioned patent application while still achieving very significant time reduction with respect to the traditional (two words at a time) adding technique of prior art computers mentioned above.

SUMMARY OF THE INVENTION

Significant decrease in computer time is achieved in the addition of a multiplicity of words by a modulo threshold operator data processing procedure in which the correspondingly weighted bits of the words to be added are applied to respective bit column adders. Each column adder simultaneously produces a sum bit and carry bits comprising the total of the respectively applied column of bits. The sum and carry bits corresponding to adjacent bit columns possess overlapping positional weight, the maximum number of sum and carry bits sharing the same weight being determined by the number of words to be added. In the disclosed example of seven words to be added, three sum and carry bits represent the sum of each column of bits and no more than three of the overlapping sum and carry bits from adjacent columns share the same weight. The three sum and carry bits resulting from the addition of each column of bits are distributed with appropriate weight into three respective subtotal words. In effect, the seven original operand words to be added are reduced to three subtotal words in one computational cycle. The three subtotal words, in turn, may be processed in conventional carry-save and carry look-ahead adders to yield the desired final sum.

If there are more than seven words to be added using the apparatus of the disclosed embodiment, the first three subtotal words can be added together with four new words in a second computation cycle. The resulting second three subtotal words are added together with four new words in a third computation cycle and so on until no new words remain to be added. The final resulting three subtotal words then can be summed conventionally to yield the desired final sum. Another scheme is to subdivide the input quantities into groups of seven words, each of which is given the seven-to-three transformation; the subtotals are grouped again, and so on.

Generally, the scheme applies to the summation of $2^q-1$ operands, which yields in one computation cycle, $q$ words as an intermediate sum. When $q$ is greater than 2, more than half of the operands are "retired" ie, disposed of in one cycle. When many words are to be summed together, as in a multiplication, the hardware can be employed repeatedly. The maximum efficiency is maintained as long as there are $2^q-1$ words to be summed, in a "$(2^q-1)$ to $q$" column adder device embodying the principle disclosed in the present application. With fewer than the maximum $(2^q-1)$ operands the device continues to be applicable though at a lower efficiency. When the number of operands is three, two words result in one cycle; afterwords the device behaves like a carry-save adder.

DESCRIPTION OF THE PREFERRED EMBODIMENT

Figure 1:
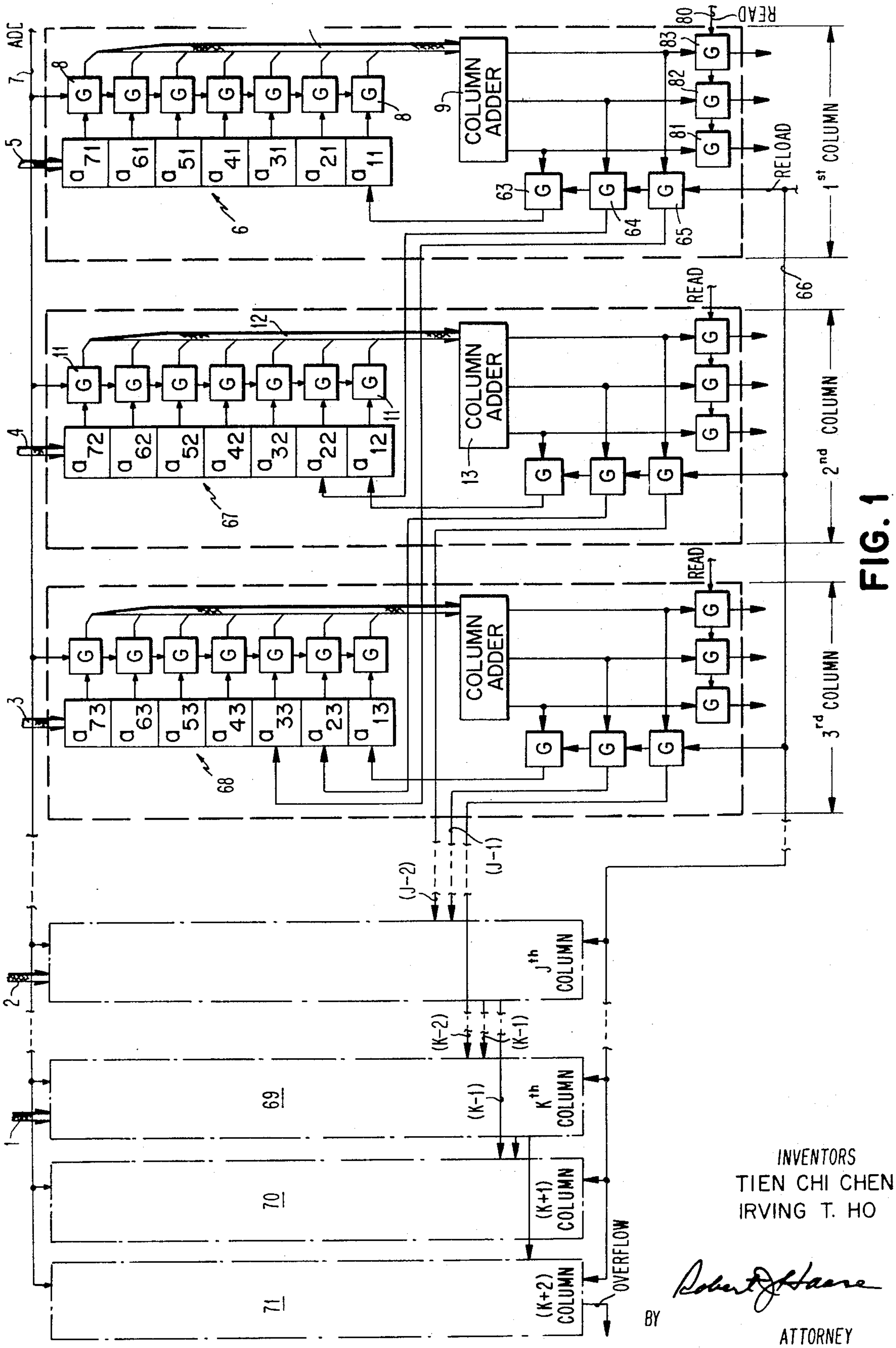
FIG. 1 is a simplified block diagram of a seven word (seven number) embodiment of the modulo threshold operator adder of the present invention.

FIG. 1 represents an embodiment of the present invention adapted for the fast addition of seven words (representing seven numbers) each being k bits in length. The seven words initially are loaded from a data source such as a buffer register (not shown) via loading cables 1–5. Register 6, associated with cable 5, receives the least significant bits of the words to be added. After loading is accomplished in a conventional manner, an add signal is applied to bus 7 which simultaneously renders conductive each of the gates (such as gates 8) associated with the respective storage registers. Thus, all the bits of the seven words to be added having the same weight are routed by the conducting gates to a respective column adder such as adder 9 which receives the least significant bit outputs from conducting gates 8 via cable 10. At the same time, the second least significant bit outputs are routed via conducting gates 11 and cable 12 to column adder 13. The remaining bits are likewise directed to respective column adders corresponding to the bit weights.

Figure 2:
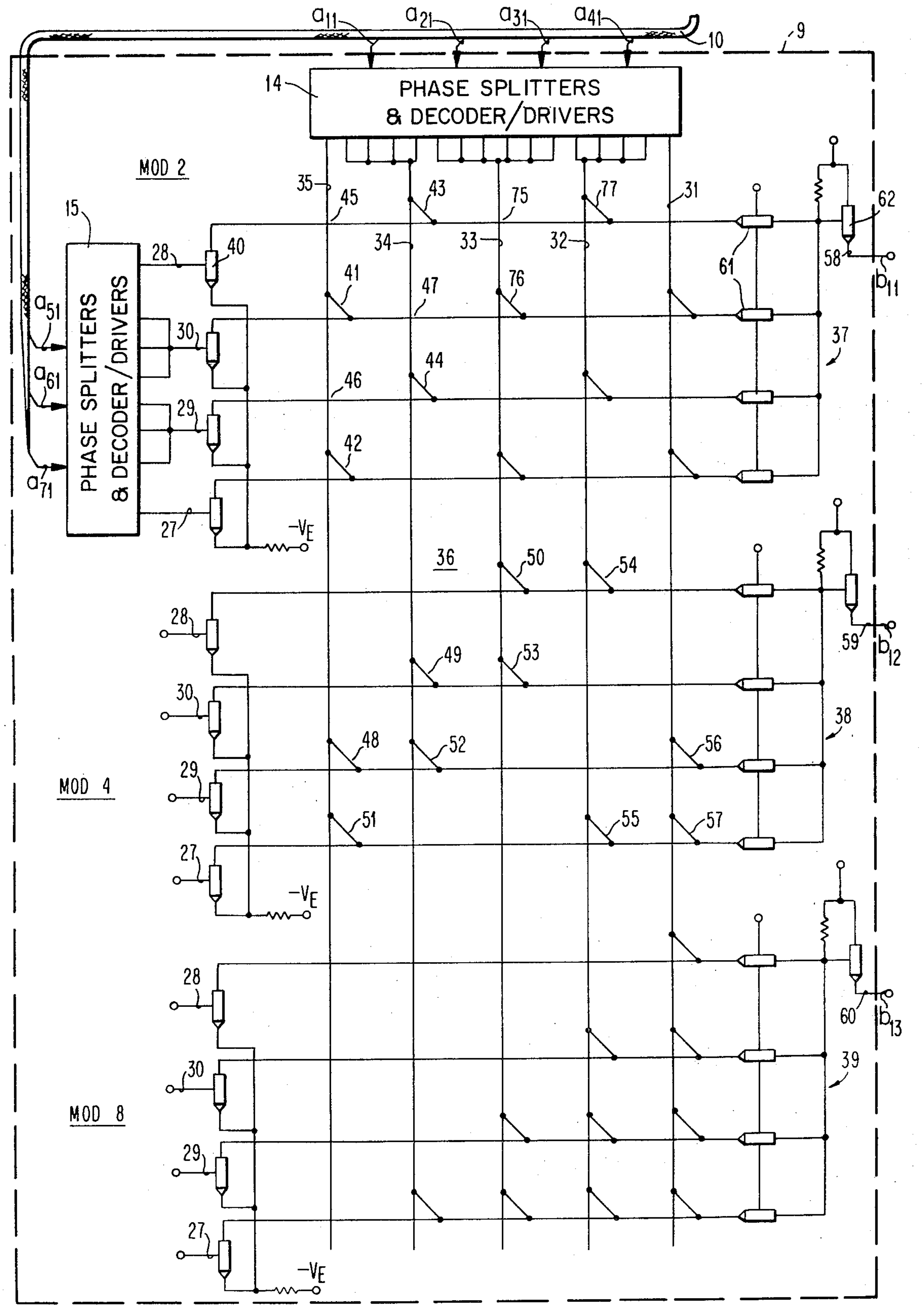
FIG. 2 is a simplified block diagram partially schematic in form of one of the column adders used in the embodiment of FIG. 1.

A typical column adder such as column adder 9 of FIG. 1 is represented in FIG. 2. The least significant bits of the seven words to be added are routed through conducting gates 8 and applied via cable 10 to phase splitters and decoder/drivers 14 and 15 of FIG. 2. Four of the least significant bits, namely, bits $a_{11}$, $a_{21}$, $a_{31}$, and $a_{41}$, are applied to phase splitters and decoder/drivers 14 whereas bits a $a_{51}$, $a_{61}$, and $a_{71}$ are applied to phase splitters and decoder/drivers 15.

Figure 3:
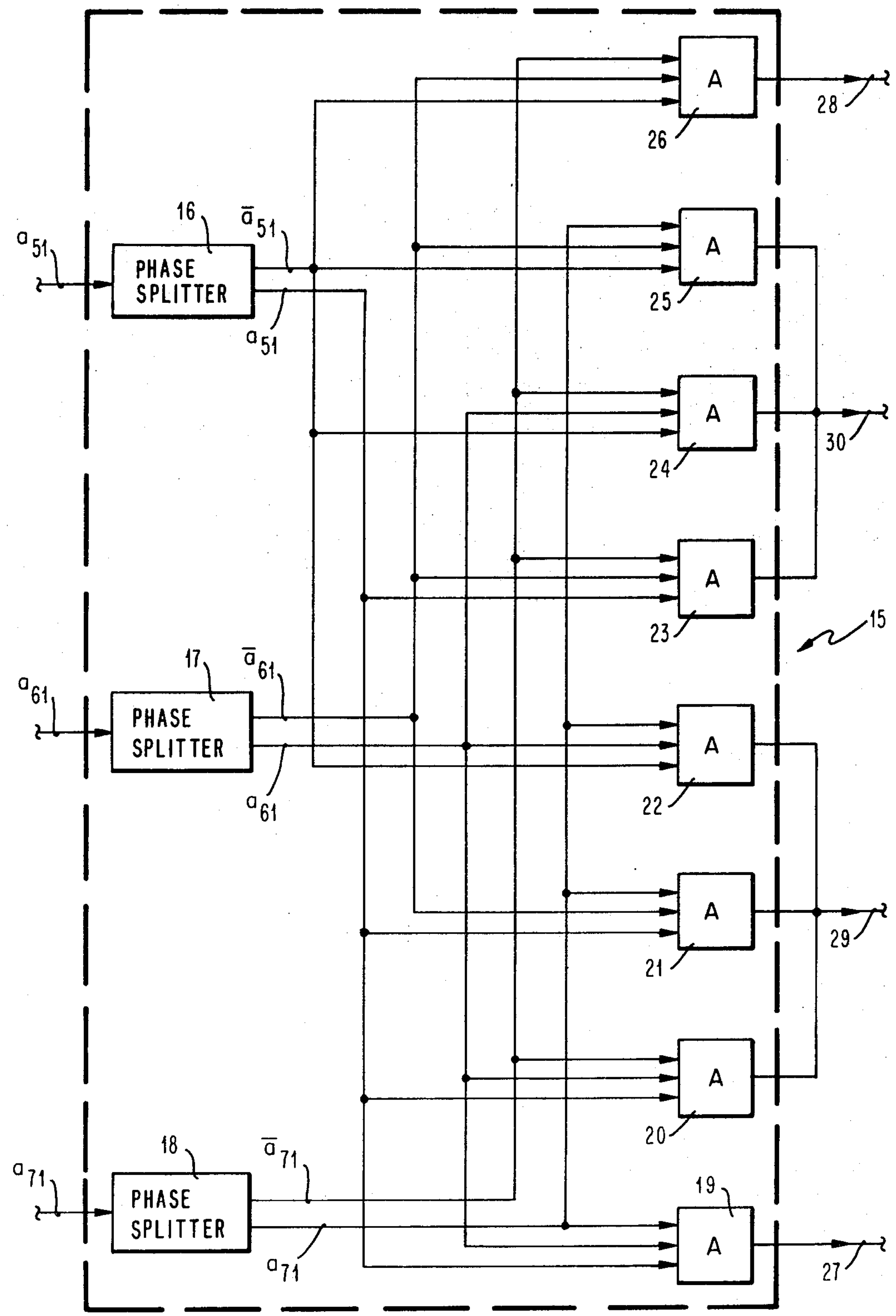
FIG. 3 is a simplified block diagram of the phase splitters and decoder/drivers (AND gates) utilized as part of the column adder of FIG. 2.

The phase splitters and decoder/drivers are shown in more detail in FIG. 3. For the sake of simplicity and clarity of exposition, FIG. 3 shows only the specific arrangement employed in phase splitters and decoder/drivers 15 of FIG. 2. A directly similar arrangement is employed in phase splitters and decoder/drivers 14 as will become apparent from the following discussion. Referring to FIG. 3, the least significant bits from the fifth, sixth and seventh of the words to be added, ie, bits $\overline{a_{51}}$, $\overline{a_{61}}$, and $\overline{a_{71}}$ are applied to phase splitters 16, 17 and 18, respectively. Each of the phase splitters provides a first output which is logically the same as its respective input and a second output which is the logical not thereof. The outputs from the respective phase splitters are distributed to decoder/drivers (AND gates) 19–26 in the indicated manner whereby AND gate 19 provides an output on line 27 solely when all three of the inputs are "ones", ie, $a_{51}$, $a_{61}$ and $a_{71}$. Correspondingly, AND gate 26 provides an output on line 28 when each of the three inputs is a zero, ie, $a_{51}$, $a_{61}$, and $a_{71}$. As can be seen from inspection of the distribution of the outputs from phase splitters 16, 17 and 18 to AND gates 20–25, each of AND gates 20, 21 and 22 provides an output on "wired OR" line 29 when any two of the three inputs are "ones." Each of AND gates 23, 24 and 25 provides an output on "wired OR" line 30 when only one of the three inputs is a "one." Thus, signals are produced on lines 28, 30, 29 and 27, respectively, when none of the three inputs to phase splitters 16, 17 and 18 is a "one," one of said three inputs is a "one," two of said three inputs is a "one," and all three of said three inputs in a "one." Phase splitters and decoder/drivers 14 of FIG. 2 are arranged in a directly analogous manner whereby outputs are produced on lines 31–35, respectively, when all four of the inputs $a_{11} - a_{41}$ are "ones" three of said four inputs are "ones" two of said four inputs are "ones," one of said four inputs is a "one," and none of said four inputs is a "one."

Lines 31–35 inclusive constitute the Y-direction inputs to matrix 36 consisting of modulo 2 portion 37, modulo 4 portion 38 and modulo 8 portion 39. Each of said portions 37, 38 and 39 also receives the same X-direction input on lines 28, 30, 29 and 27, previously described in connection with FIG. 3. Said X direction inputs are inverted by invertors 40 solely to meet the conduction requirements of the transistor switches which have been selected in the preferred embodiment to establish selective connections at predetermined cross-overs in the matrix 36. Briefly, the base of each transistor switch is connected to one of the Y direction lines 31–35, the collector thereof is connected to a source of reference potential, while the emitter is connected to one of the X direction lines 28, 30, 29 and 27. Thus, an addressed transistor switch is rendered conductive by the simultaneous Y and X signals of opposite direction which are applied to the base and emitter thereof. Inverters 40 would not be required if another type of switch had been selected requiring simultaneous signals of the same direction to establish selective connections at respective matrix cross overs. The transistor switches are represented in FIG. 2 by short line segments such as line segments 41, 42, 43 and 44.

It will be noted that the transistor switch connections at cross-overs of matrix 36 follow a pre-established pattern. For example, the transistor switch connections are made along every second diagonal of the matrix portion 37. That is, there is no connection at matrix cross-over 45 while there are matrix cross-over connections 41 and 43 along the next following diagonal of portion 37. Likewise, there are no connections at matrix cross-overs 46 and 47 and 75 which lie along the succeeding diagonal of matrix portion 37 whereas there are transistor switch connections 42 and 44, 76 and 77 along the following diagonal, and so on. The situation in matrix portion 38 is similar except that transistor switch connections are omitted along the first two diagonals but are present in both of the next succeeding two diagonals (such as connections 48, 49 and 50 and connections 51, 52, 53 and 54). Transistor switch connections are absent along the next following two matrix diagonals and then reappear along the last two diagonals as shown by connections 55 and 56 and by connection 57. The matrix cross-over pattern of portion 37 is deemed "modulo 2" in view of the fact that the pattern of cross-over connections repeats itself over a cycle of two matrix diagonals. Similarly, the pattern of matrix cross-over interconnections of portion 38 is deemed "modulo 4" considering that the cross-over connection pattern repeats itself over a cycle of four matrix diagonals. Lastly, the cross-over connection pattern of portion 39 is deemed "modulo 8" in view of the pattern repetition cycle of eight matrix diagonals as shown in the drawing.

Matrix portions 37, 38 and 39 provide respective outputs representing the sum bit output designated $b_{11}$ on line 58, carry bit output designated $b_{12}$ on line 59, and carry bit output designated $b_{13}$ on line 60. Each of the output bits is produced by ORing the X direction lines of the respective matrix portion with the aid of isolation transistors 61 and summing transistor 62 as shown in typical portion 37. The bits represented by signals on output lines 58, 59 and 60 of FIG. 2 can be summarized explicitly as follows: bit $b_{11}$ is a one if one, three, five or seven of the seven bits $a_{11} - a_{71}$ at the inputs to phase splitters and decoder/drivers 14 and 15 is a "one." Bit $b_{12}$ is a one if two, three, six or seven of the input bits are "ones." Bit $b_{13}$ is a one if four, five, six or seven of the input bits are "ones." As the number of "ones" in the input bits increases from zero towards seven, bit $b_{11}$ recycles its values every two increments, bit $b_{12}$ recycles every four increments and bit $b_{13}$ recycles every eight increments. The aforementioned pattern of recycling of the sum bit $b_{11}$ and carry bits $b_{12}$ and $b_{13}$ values is characteristic of the modulo threshold operator which determines the diagonal cross over connection pattern of portions 37, 38 and 39 of matrix 36 of FIG. 2 previously discussed.

Referring again to FIG. 1, the sum and carry bit outputs of column adder 9 (represented by FIG. 2) are directed to gates 63, 64 and 65 which are simultaneously rendered conductive by a signal on reload bus 66. Upon the occurrence of a signal on bus 66, sum bit $b_{11}$ is recirculated back to replace previously stored bit $a_{11}$ in register 6, carry bit $b_{12}$ replaces stored bit $a_{22}$ of the next higher order storage register 67, while carry bit $b_{13}$ replaces stored bit $a_{33}$ of the next higher order storage register 68. Column adder 13 and the other column adders associated with the remaining bits of the $k$ bit words being added produce sum and carry bits which are similarly applied to storage registers of increasing weights as indicated in FIG. 1. The storage register associated with the kth column 69 is the final one which receives a column of seven input bits via loading cable 1. The storage register associated with the $(k+1)$th column receives only two carry bits from two preceding column adders whereas the storage register associated with the $(k+2)$th column 71 receives only one carry bit from the column adder in the kth column 69. No bits from the words to be added are applied to the storage registers 70 and 71.

In operation, seven words of $k$ bits each are loaded from buffer registers (not shown) into the storage registers typified by registers 6, 67, 68, etc. Upon the occurrence of an add signal to bus 7, the seven original words are reduced to three new subtotal words comprising bits $b_{11} - b_{k1}$, $b_{12} - b_{k2}$, and $b_{13} - b_{k3}$. It will be noted that the least significant bit $b_{12}$ of the second subtotal word is one binary order of magnitude higher in weight than the least significant bit $b_{11}$ of the first subtotal word. Similarly, the least significant bit $b_{13}$ of the third subtotal word is two binary orders of magnitude higher than the least significant bit $b_{11}$ of the first subtotal word.

If only seven words are to be added together, the three resulting subtotal words may be reduced to a single word representing the desired final sum by carrying out additional computation cycles wherein said three subtotal words are reduced to two subtotal words in the first additional cycle. Repeated subsequent application of the device will yield a single word which represents the desired final sum. All words excepting the remaining subtotal words representing extra carry bits are automatically set to zero in the recycling process during these last computation cycles to obtain the final sum. It is preferable, however, to utilize carry-save and carry look ahead adders already available in standard large computers in which the present invention is particularly suitable for use to obtain the final sum in minimum time. In this case the three resulting subtotal words are applied directly to a conventional carry-save adder (not shown) and then to a conventional carry look-ahead adder (not shown) for deriving the desired final sum.

In the event that more than seven words are to be added, seven are chosen to be added first, then a signal is applied to reload bus 66 to enter the sum bits and carry bits constituting the three subtotal words into the appropriate locations of the digit column storage registers and then four new words (possibly subtotal words from other summations) are loaded into the remaining four bit locations of the same storage registers. The next add signal appearing on bus 7 initiates a new summation process. The same process is iterated until there are no new words to be entered into the storage registers. The then existing three words remaining in the storage registers are applied to a carry-save adder and then to a carry look ahead adder to produce a final sum.

The determination of whether or not additional new words remain to be added after any given computation cycle is completed may be made by continuously monitoring the buffer register (not shown) to which the loading cables 1–5 are connected for the presence of words to be added. Such monitoring techniques have been omitted from the present specification because they are known to those skilled in the art and form no part of the present invention. In the event that additional words to be added are present in the buffer register, the monitoring means provides a signal to reload bus 66 to prepare for another cycle of addition. If no new words remain to be added, the monitoring means provides a signal to read bus 80 which actuates gates (such as gates 81, 82 and 83 of FIG. 1 connected to the outputs of column adder 9) for the transfer of the sum and carry bit subtotal numbers to the carry-save and carry look ahead adders to produce a final sum.

It will be recognized that a number of conventional computer system details have been omitted from the disclosure of the exemplary embodiment of the present invention for the sake of brevity and clarity of exposition. For example, computer system timing and control hardware have been omitted from the drawing but these require no more than conventional computer system design techniques well known to those skilled in the art to accomplish in proper timing sequence the successive computational cycles which are necessary for loading the words to be added into the digit column adders and either initiating a new cycle of addition if new words remain to be added or directing the three subtotal numbers to the carry-save and carry look ahead adders in the event that no new numbers remain to be added.

The present invention is readily adapted to receive more than seven words at a given time in which case more than three subtotal words are produced in a given computation cycle. For example, if the apparatus is extended to receive from eight to 15 words to be added, four subtotal words are produced at the end of the first computation cycle. In general, if $(2^q - 1)$ words are added, then $q$ subtotal words result in a given computation cycle, $2^q - (q+1)$ words having been "retired" or disposed of. The apparatus can be used repeatedly and as long as there are $2^q-1$ words to be summed, maximum efficiency can be maintained. When only three subtotal words remain, the use of a three-input adder may be more efficient.

While this invention has been particularly described with reference to the preferred embodiments thereof, it will be understood by those skilled in the art that the foregoing and other changes in form and details may be made therein without departing from the spirit and scope of the invention.

What is claimed is:

1. A fast adder for multi-word additions comprising:

a plurality of bit column adders equal in number to the number of bits in the operand words to be added, each said column adder receiving input signals representing equally weighted bits of $(2^q-1)$ words to be added, each said column adder producing output signals representing a sum bit and $(q-1)$ carry bits constituting the total of the respectively received bits of said numbers to be added; each said column adder comprising AND gates responsive to said input signals and producing signal outputs, means for combining said signal outputs in accordance with the quantity of identically valued bits in the numbers represented by said signal outputs, signal outputs representing the same quantity of identically-valued bits being commonly combined, and an X–Y matrix of conductors receiving said commonly combined signal outputs and having actuatable switches at selected matrix intersections, said switches being actuated by said commonly combined signal outputs, said switches being located along diagonals of said matrix in a plurality of different patterns, each pattern repeating over a respective number of matrix diagonals;

*q* word registers, and means for distributing with proper relative weight said sum bit and carry bit signals to said *q* word registers, respectively, *q* being an integer greater than 2.

2. The fast adder defined in claim 1 and further including a plurality of bit registers equal in number to said plurality of digit column adders, each register storing said signals representing respective equally weighted bits of said words to be added, said column adders being connected to the outputs of respective bit registers, said word registers comprising portions of said bit registers.

3. The fast adder defined in claim 1 wherein each said respective number of matrix diagonals is exponentially related to every other respective number of matrix diagonals.

4. The fast adder defined in claim 3 wherein each said respective number of matrix diagonals is related to every other respective number of matrix diagonals by a power of 2.

5. The fast adder defined in claim 4 wherein *q* equals 3.

6. The fast adder defined in claim 5 and further including a plurality of bit registers equal in number to said plurality of digit column adders each register storing said signals representing respective equally weighted bits of said words to be added, said column adders being connected to the outputs of respective bit registers, said word registers comprising portions of said bit registers.

7. A bit column adder receiving input signals representing respective bits to be added and producing output signals representing a sum bit and carry bits constituting the total of the received bits, said column adder comprising:

AND gates responsive to said input signals and producing signal outputs, means for combining said signal outputs in accordance with the quantity of identically valued bits in the numbers represented by said signal outputs, signal outputs representing the same quantity of identically-valued bits being commonly combined, and an X–Y matrix of conductors receiving said commonly combined signal outputs and having actuatable switches at selected matrix intersections, said switches being actuated by said commonly combined signal outputs, said switches being located along diagonals of said matrix in a plurality of different patterns, each pattern repeating over a respective number of matrix diagonals.

8. Apparatus receiving input signals representing respective binary bits and producing an output signal in response to predetermined combinations of said binary bits, said apparatus comprising:

AND gates responsive to said input signals and producing signal outputs, means for combining said signal outputs in accordance with the quantity of identically valued bits in the numbers represented by said signal outputs, signal outputs representing the same quantity of identically-valued bits being commonly combined, and an X–Y matrix of conductors receiving said commonly combined signal outputs and having actuatable switches at selected matrix intersections, said switches being actuated by said commonly combined signal outputs, said switches being located along diagonals of said matrix in a pattern repeating over a number of matrix diagonals.

* * * * *